(12) United States Patent
Burgdorf et al.

(10) Patent No.: US 6,318,814 B1
(45) Date of Patent: Nov. 20, 2001

(54) VALVE FOR HYDRAULIC BRAKE SYSTEM WITH SLIP CONTROL

(75) Inventors: Jochen Burgdorf, Offenbach; Peter Volz, Darmstadt, both of (DE)

(73) Assignee: Continental Teves AG & Co., OHG, Frankfurt (DE)

(*) Notice: Subject to any disclaimer, the term of this patent is extended or adjusted under 35 U.S.C. 154(b) by 0 days.

(21) Appl. No.: 09/424,147
(22) PCT Filed: May 20, 1998
(86) PCT No.: PCT/EP98/02967
  § 371 Date: Feb. 24, 2000
  § 102(e) Date: Feb. 24, 2000
(87) PCT Pub. No.: WO98/52802
  PCT Pub. Date: Nov. 26, 1998

(30) Foreign Application Priority Data

May 24, 1997 (DE) .............................................. 197 21 837

(51) Int. Cl.[7] ...................................................... B60T 8/34
(52) U.S. Cl. ..................................... 303/113.1; 303/116.2; 303/DIG. 11
(58) Field of Search .............................. 303/113.1, 113.2, 303/116.1, 116.2, 119.2, 119.3, DIG. 10, DIG. 11, 900

(56) References Cited

U.S. PATENT DOCUMENTS 2,059,760   11/1936  Teahen .
5,417,484 * 5/1995  Reinartz et al. ................. 303/116.1
5,505,529 * 4/1996  Siegel et al. ..................... 303/116.2
5,605,384   2/1997  Johnston et al. .
6,209,969 * 4/2001  Aumuller et al. ................ 303/116.1

FOREIGN PATENT DOCUMENTS 90 04 900    8/1990   (DE) .
43 37 133    5/1995   (DE) .
196 32 343   5/1997   (DE) .
1 047 323    12/1953  (FR) .

* cited by examiner

*Primary Examiner*—Christopher P. Schwartz
(74) *Attorney, Agent, or Firm*—Rader, Fishman & Grauer PLLC

(57) ABSTRACT

The present invention relates to an automotive vehicle brake system with wheel slip control which is provided with a so-called filling valve, i.e., a non-return valve, between a secondary and a primary circuit. Initially, both circuits are evacuated for filling the brake system with pressure fluid, and evacuation of the secondary circuit is effected by way of the non-return valve that opens. The present invention suggests providing this valve with a blocking device which becomes effective when the brake is actuated for the first time, thereby causing pressure build-up in the primary circuit. The blocking device retains the valve closure member on the valve seat member, with the result that the non-return valve remains closed in the normal operation of the brake system. It is prevented by this provision that vacuum develops in the secondary circuit during a braking operation.

8 Claims, 2 Drawing Sheets

VALVE FOR HYDRAULIC BRAKE SYSTEM WITH SLIP CONTROL

TECHNICAL FIELD

The present invention generally relates to vehicle brake systems and more particularly relates to a hydraulic automotive vehicle brake system with wheel slip control and a valve for such a system.

BACKGROUND OF THE INVENTION

A hydraulic brake system with a primary circuit and a secondary circuit is described in German patent application No. 43 37 133. The term 'primary circuit' refers to the connecting lines and channels which connect the master brake cylinder of the brake system to the wheel brakes and through which brake fluid is conducted in the direction of the wheel brakes during normal braking operations. The term 'secondary circuit' refers to those connecting lines and channels which are penetrated by pressure media in the case of wheel slip control.

The secondary circuit is connected to the primary circuit by way of an outlet valve on the inlet side and by way of a so-called return pump on the outlet side. The brake system is filled with a conventional brake fluid as a pressure medium. Filling is effected at the end of the vehicle assembly on the assembly line, that means, after the brake system has been installed into the vehicle in dry condition. The following procedure has proved to be quick and unproblematic to carry out. Initially, the entire system is evacuated and, in the evacuated condition, is thereafter connected to a brake fluid reservoir. The result is that brake fluid enters into the brake system and first fills the primary circuit. In order that the secondary circuit is also filled with pressure fluid, the electromagnetically operable outlet valve is opened during this process, i.e., both during evacuation and filling. This is disadvantageous inasmuch as provision must be made at the filling station to switch the normally closed outlet valve to adopt its open position.

Therefore, it has been suggested in German patent application No. 43 37 133 to interpose a non-return valve, which opens towards the primary circuit, between the secondary circuit and the primary circuit. This valve will open during evacuation of the system so that both circuits are evacuated. When the valve closure member is not acted upon by a spring in the closing direction, as is disclosed in the first embodiment of the above publication, the valve remains open at the end of the evacuation process so that both the primary circuit and the secondary circuit are filled with pressure fluid during the filling process. In a second embodiment, it is emphasized as favorable that the non-return valve closes after the evacuation process. According to the application, this is said to be achieved because the valve closure member is arranged above the valve seat and urged against the valve seat by the force of gravity. In a wheel slip control operation which is induced on a roller test bench, where the outlet valve is opened and the return pump switched on, brake fluid flows into the secondary circuit.

The disclosure of German patent application No. 43 37 133 ensures a rapid and simple method of filling the brake system with brake fluid during the vehicle assembly. However, the additional installation of a non-return valve between the secondary circuit and the primary circuit involves some shortcomings. One disadvantage is the need for absolute seal-tightness of the valve because otherwise master cylinder pressure is built up in the secondary circuit during a braking operation, with the result that pressure reduction is not possible in the wheel brakes during wheel slip control.

A metal/metal seal pairing for the valve seat and the valve closure member is inappropriate because contaminants or chips may gather between the valve seat and the valve closure member and prevent complete closure of the valve.

Therefore, generic German patent application No. 19632343 disclosed making at least the sealing lip of the valve closure member of a relatively soft plastic material which receives and stores the contaminants contained in the brake fluid so that reliable closure of the non-return valve is ensured. Further, it has been disclosed to load the valve closure member with a weak spring so that both circuits are evacuated during the evacuation process, similar to the second suggestion made in German patent application No. 43 37 133. Initially, only the primary circuit is filled with brake fluid during the filling process, while the secondary circuit is filled by opening the outlet valve in an induced wheel slip control operation. However, this solution, too, involves problems, especially in those cases where the secondary circuit is constituted by a channel in a so-called valve block made of steel or aluminum. Upon brake application, where pressure develops in the primary circuit, the pressure is applied to the valve closure member which, by compression of its elastically yielding sealing lip, is displaced in the direction of the secondary circuit. The volume decreases which is provided for the pressure fluid in the secondary circuit, with the result that a corresponding part of the brake fluid is displaced past the sealing lip into the primary circuit. After release of the brakes, that is, after the pressure in the primary circuit has been reduced again, the valve closure member is shifted back again, under the elastic effect of its sealing lip. The space in the secondary circuit which is available for the pressure fluid will re-increase, with the result that a vacuum develops therein which is not desirable. One possibility of overcoming the problem would be to increase the bias of the valve spring, which, in turn, would prevent a complete evacuation of the secondary circuit. This would necessitate a special filling process.

Thus, an object of the present invention is to configure the non-return valve so that it is appropriate to eliminate the above-mentioned problems when used in the automotive vehicle brake system with wheel slip control described hereinabove.

To this end, the present invention suggests the provision of a blocking device which cannot be released, at least in the normal operation of the brake system, and which, in the blocking condition, is appropriate to keep the valve closure member in the closing position.

Those conditions shall be understood as the 'normal operation' of a brake system, where pressure develops in the primary circuit. The purpose of the blocking device is to prevent a pressure fluid exchange by way of the non-return valve.

The blocking device is so configured that it becomes effective when the valve closure member is loaded by pressure for the first time, i.e., during a braking operation.

For example, the blocking device can be a unilaterally acting blocking device, i.e., it becomes engaged as soon as the valve closure member has been displaced in the direction of the secondary circuit.

The blocking device includes a lock bar which is resiliently yieldingly arranged on the valve closure member and engages a (main) catch on the valve seat member.

Also, the lock bar can be utilized to retain the valve closure member on a first catch on the valve seat member to permit installation of the unit made up of valve spring, valve closure member, and a valve seat member into a corresponding housing.

Preferably, the catches are provided on a valve seat member in which the valve passage is contained on the side remote from the valve closure member, and the lock bar is arranged on an elastically yielding holder element which extends through the valve passage.

DETAILED DESCRIPTION OF THE PREFERRED EMBODIMENTS

Figure 1:
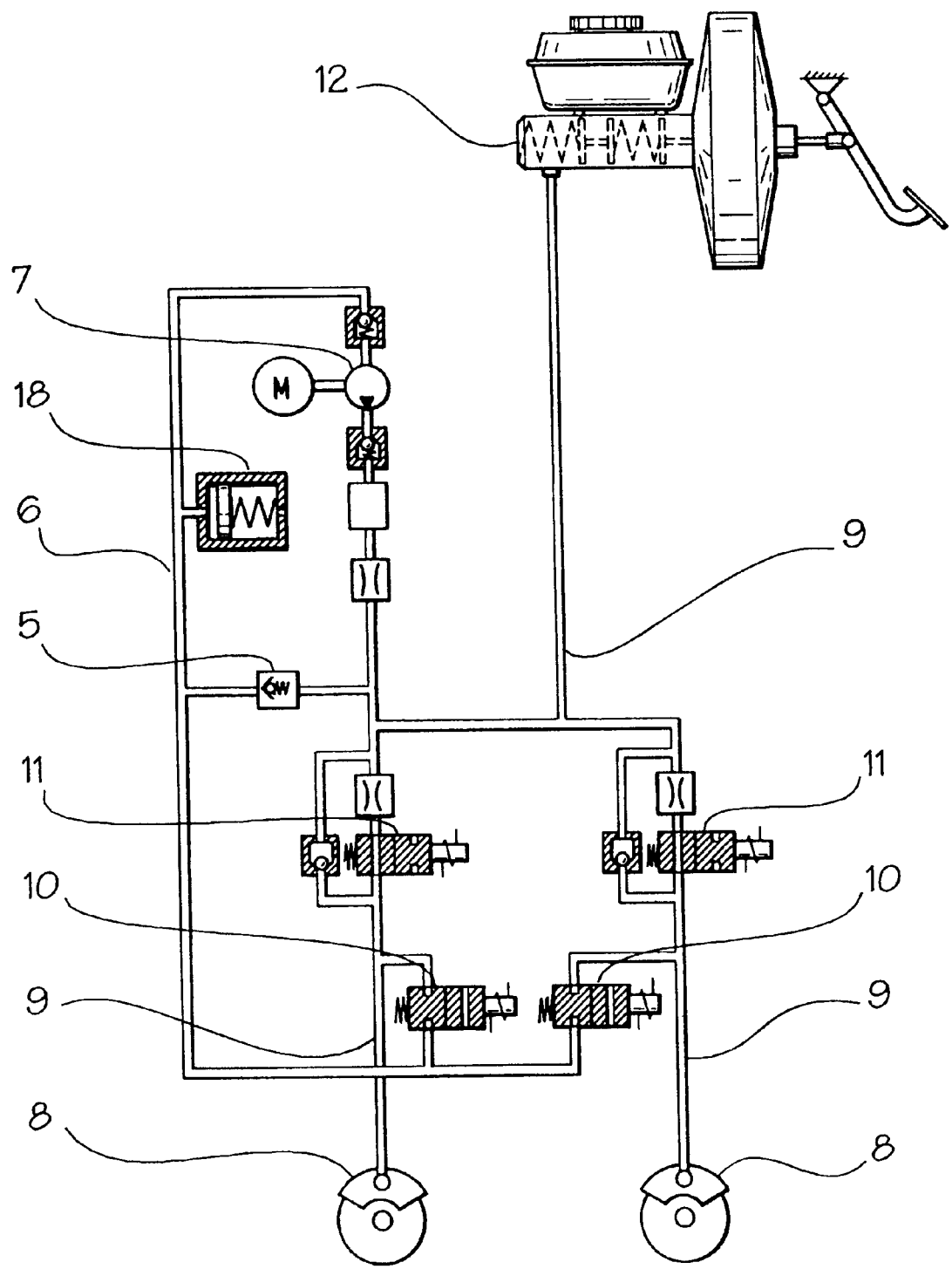
FIG. 1 is a hydraulic circuit arrangement for an automotive vehicle brake system with wheel slip control with a diagrammatic representation of the non-return valve of the present invention.

FIG. 1 shows the hydraulic circuit diagram for a hydraulic automotive vehicle brake system with wheel slip control which operates according to the recirculation principle.

A braking pressure conduit 9 connected to a braking pressure generator 12 is branched to lead to two wheel brakes 8, and open inlet valves 11 which are not energized electromagnetically in the initial position are inserted into the branch lines of the braking pressure conduit 9. This hydraulic portion of the brake system shall be referred to by the term 'primary circuit' in the following. Outlet valves 10 which are closed in their initial position are arranged in the braking pressure conduits 9 between the inlet valves 11, open in their initial position, and the wheel brakes 8. Valves 10 are in connection to a suction conduit 6 of a pump 7. Succeeding the suction conduit 6 is a bypass line which is connected to the braking pressure conduit 9 and accommodates a non-return valve 5 that will be explained in detail hereinbelow. The valve closure member 1 of the non-return valve 5 is acted upon by a valve spring 4 in the closing direction so that the non-return valve 5 permits a hydraulic connection exclusively from the suction conduit 6 to the braking pressure conduit 9. Interposed between the connection of the non-return valve 5 to the suction conduit 6 and the pump 7 in the bypass line is a low-pressure accumulator 18. The hydraulic portion which extends from the outlet valves 10, closed in the initial position, to the pump 9 is described by the term 'secondary circuit' in the following. The pump 7 includes a schematically exhibited suction valve and a pressure valve and is downstream. Constructive details of the non-return valve 5, which is represented in the hydraulic circuit arrangement, can be taken from FIGS. 2 and 3.

Accordingly, the non-return valve 5 is accommodated in a blind-end bore 13 of an accommodating member 14 which can be configured in a cartridge-type construction and as an insert member that is separately fitted in a valve block. However, valve 5 may also be inserted directly into the accommodating member of one of the outlet valves 10. Between a preferably metallic valve closure member 1 and a metallic valve seat member 2, the non-return valve 5 includes an elastomeric sealing member 3 which embraces the valve closure member 1 like a cap and has a circumferential bead or a lip 20 as an actual sealing element. Under the effect of spring 4, the bowl-shaped elastomeric sealing member 3 with its bead 20 bears against a disc-shaped sealing surface of the valve seat member 2 which is attached by means of caulking in the blind-end bore 13 of the accommodating member 14. Consequently, the secondary circuit which is separated by way of electrically and hydraulically operable valves can be considered as an isolated area in the hydraulic system.

Two leaf-shaped holders 21, 21' which run in parallel to each other extend on the valve closure member 1 in an axial direction, and two lock bars 22, 22' project outwardly from the ends of the holders remote from the valve closure member 1. The two holders 21, 21' are spaced from one another so that they can both be swiveled resiliently inwardly towards the axis.

At its end remote from the valve closure member 1, the valve passage 25 in the valve seat member 2 has an annular enlarged portion 27 having a diameter which is increased compared to the diameter of the valve passage 25. The inner step of the enlarged portion on the transition to the valve passage forms a first catch step 28. The surface of the valve seat member 2 remote from the valve closure member represents the actual catch step 30.

The distance between the two catch steps 28, 30 corresponds roughly to the possible compression of the sealing bead 20. The holders have such a length that the lock bars 22, 22' grip behind the first catch step 28 in the normal position of the valve 3 shown in FIG. 1. When the lock bars 22, 22' have adopted such a position, they are pressed against the walls of the enlarged portion 27 by the biased holders 21, 21'.

The valve spring 4 is attached to the valve closure member 1, for example, the top loop of the spring can be positioned in a groove on the valve closure member 1. Thus, the valve seat member 2, the valve closure member 1, and the valve spring 4 form a construction unit which can be inserted as whole into the accommodating member 14.

During evacuation, a vacuum is generated in the bottom chamber 31 which is directly connected to the primary circuit. The vacuum causes the valve closure member 1 to lift from the valve seat member 2 so that a vacuum develops also in the top chamber 32 which is connected to the secondary circuit. To permit lifting of the valve closure member 1, a corresponding clearance is provided between the lock bars 21, 21' and the first catch step 28. In the filling process, the sealing bead 20 of the closure member 1 moves into abutment on the valve seat member 2 again so that only the primary circuit is filled. Filling of the secondary circuit is effected by opening one of the outlet valves 10, as has been described hereinabove.

Figure 2:
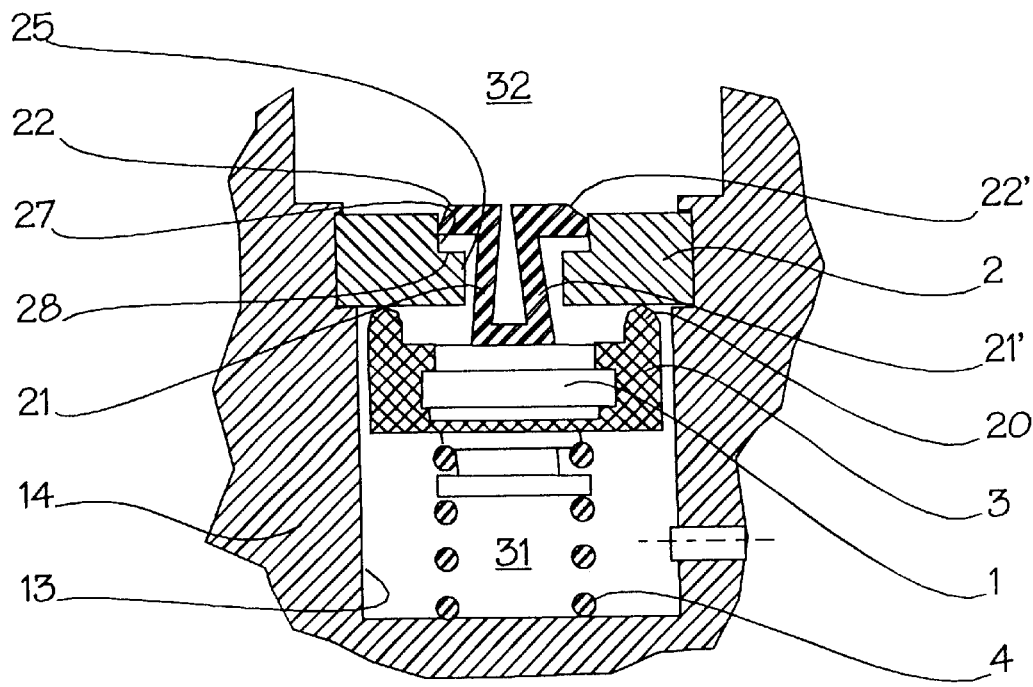
FIG. 2 is an embodiment of the non-return valve in the position of operation.
Figure 3:
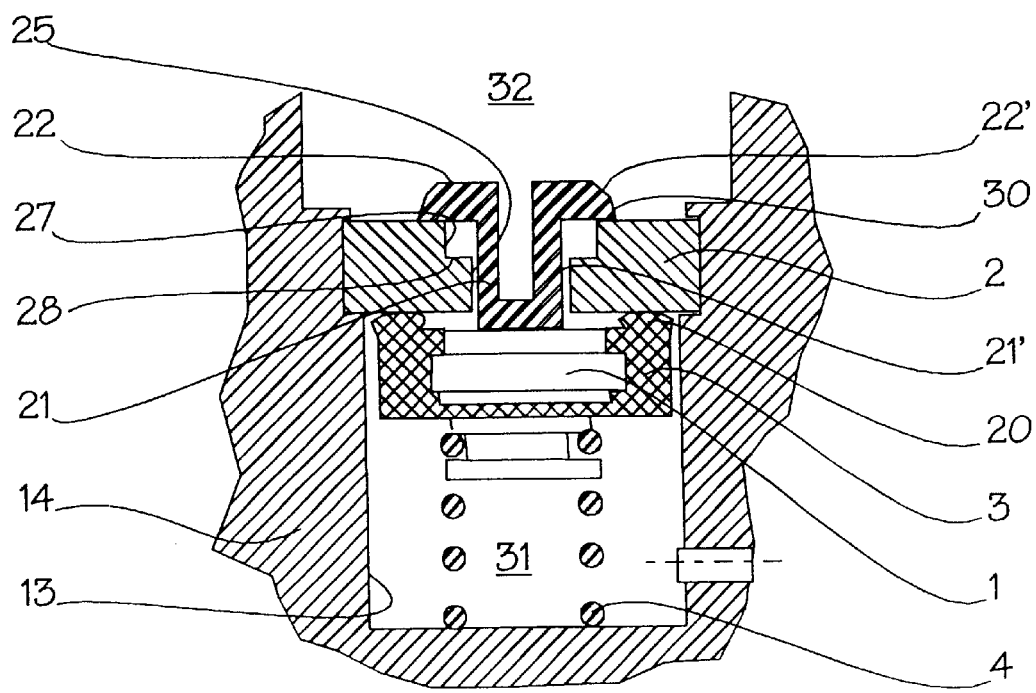
FIG. 3 is a view of the same valve in the closed position.

The situation in a first pressure build-up in the brake circuit is illustrated in FIG. 2. When subjected to the pressure in the bottom chamber 31, the valve closure member 1 is urged against the valve seat member 2, the bead 20 is compressed, and the lock bars 22, 22' are lifted beyond the main catch 30. Caused by the bias of the holders 21, 21' the lock bars 22, 22' are urged outwardly and move into position behind the main catch 30, with the result that the valve closure member 1 is fixed on the valve seat member 2, with the bead 20 compressed.

This closes the non-return valve 5 permanently, with the result that the automotive vehicle brake system no longer differs from an automotive vehicle brake system without a non-return valve for the filling process. Thus, it is reliably prevented by the locking of the closure member that vacuum develops in the secondary circuit in a braking operation.

Because the valve closure member 1 is retained close to the valve seat member 2 in the first catch position, the need for the valve spring 4 may be obviated under certain circumstances in this embodiment so that the secondary circuit can be filled for the first time together with the filling of the primary circuit.

The non-return valve 5 can also be arranged directly in parallel beside the outlet valve 10 in terms of circuitry, bypassing the inlet valve 11. This does not require further illustration.

What is claimed is:

1. Non-return valve for use in a slip-controlled hydraulic brake system, comprising:

a valve seat member, an elastically yielding valve closure member, a blocking device which cannot be released, during use of the brake system, and which, in the blocking condition, is appropriate to keep the valve closure member in a closed position on the valve seat member, in which the elastically yielding valve closure member is almost completely compressed in abutment on the valve seat member, wherein the blocking device cooperates with the valve seat member in frictional or form-locking engagement therewith.

2. Valve as claimed in claim 1, wherein the blocking device further includes a lock bar and a catch.

3. Valve as claimed in claim 2, wherein the valve closure member includes a resiliently yielding sealing lip, and in that the lock bar and the catch are so conformed to one another that the lock bar engages the catch as soon as the sealing lip has been compressed almost completely upon displacement of the valve closure member in the closing direction.

4. Valve as claimed in claim 3, wherein the lock bar is provided on the valve closure member and the catch is provided on the valve seat member.

5. Valve as claimed in claim 4, wherein the lock bar is arranged on a free end of a holder which extends through a valve passage in the valve seat member, and in that the catch is provided on the side of the valve seat member remote from the valve closure member.

6. Valve as claimed in claim 5, further including a step on the valve closure member into which the lock bar is engaged, and there is a clearance between the step and the lock bar in the initial position of the valve.

7. Valve as claimed in claim 1, wherein the blocking device is so configured that it is caused to adopt the blocking condition when the valve closure member is pressurized for the first time in the direction to close.

8. Valve as claimed in claim 1, wherein at least two lock bars and two opposed elastically yielding holders are provided on the valve closure member, and one lock bar is respectively fitted on the outside of an associated holder, and in that the two holders can be bent towards each other.

* * * * *